United States Patent
Savvides et al.

(10) Patent No.: US 10,354,362 B2
(45) Date of Patent: *Jul. 16, 2019

(54) METHODS AND SOFTWARE FOR DETECTING OBJECTS IN IMAGES USING A MULTISCALE FAST REGION-BASED CONVOLUTIONAL NEURAL NETWORK

(71) Applicant: Carnegie Mellon University, Pittsburgh, PA (US)

(72) Inventors: Marios Savvides, Pittsburgh, PA (US); Khoa Luu, Pittsburgh, PA (US); Yutong Zheng, Pittsburgh, PA (US); Chenchen Zhu, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 1 day.

This patent is subject to a terminal disclaimer.

(21) Appl. No.: 15/698,887

(22) Filed: Sep. 8, 2017

(65) Prior Publication Data
US 2018/0096457 A1   Apr. 5, 2018

Related U.S. Application Data

(60) Provisional application No. 62/495,445, filed on Sep. 8, 2016.

(51) Int. Cl.
*G06T 3/00* (2006.01)
*G06T 3/40* (2006.01)
(Continued)

(52) U.S. Cl.
CPC ............ *G06T 3/4046* (2013.01); *G06F 16/50* (2019.01); *G06K 9/6256* (2013.01);
(Continued)

(58) Field of Classification Search
CPC ......... G06T 3/4046; G06T 2207/20084; G06T 2210/12; G06F 17/30244; G06K 9/6256;
(Continued)

(56) References Cited

U.S. PATENT DOCUMENTS

2016/0321784 A1* 11/2016 Annapureddy .......... G06K 9/66
2017/0011281 A1* 1/2017 Dijkman .................. G06K 9/66
(Continued)

OTHER PUBLICATIONS

Non-Final Office Action dated Nov. 28, 2018, in connection with U.S. Appl. No. 15/697,015, filed Sep. 6, 2017.

*Primary Examiner* — Ping Y Hsieh
(74) *Attorney, Agent, or Firm* — Downs Rachlin Martin PLLC

(57) ABSTRACT

Methods of detecting an object in an image using a convolutional neural network based architecture that processes multiple feature maps of differing scales from differing convolution layers within a convolutional network to create a regional-proposal bounding box. The bounding box is projected back to the feature maps of the individual convolution layers to obtain a set of regions of interest. These regions of interest are then processed to ultimately create a confidence score representing the confidence that the object detected in the bounding box is the desired object. These processes allow the method to utilize deep features encoded in both the global and the local representation for object regions, allowing the method to robustly deal with challenges in the problem of robust object detection. Software for executing the disclosed methods within an object-detection system is also disclosed.

20 Claims, 9 Drawing Sheets

(51) Int. Cl.
*G06K 9/62* (2006.01)
*G06F 16/50* (2019.01)

(52) U.S. Cl.
CPC ......... *G06K 9/6267* (2013.01); *G06K 9/6272* (2013.01); *G06K 2009/6237* (2013.01); *G06T 2207/20084* (2013.01); *G06T 2210/12* (2013.01)

(58) Field of Classification Search
CPC ............... G06K 9/6267; G06K 9/6272; G06K 2009/6237
See application file for complete search history.

(56) References Cited

U.S. PATENT DOCUMENTS

| | | | |
|---|---|---|---|
| 2017/0083792 A1* | 3/2017 | Rodriguez-Serrano | G06N 3/0454 |
| 2018/0032796 A1* | 2/2018 | Kuharenko | G06F 17/30256 |
| 2018/0211099 A1* | 7/2018 | Ranjan | G06K 9/00248 |
| 2018/0225550 A1* | 8/2018 | Jacobsen | G06K 9/4619 |

* cited by examiner

METHODS AND SOFTWARE FOR DETECTING OBJECTS IN IMAGES USING A MULTISCALE FAST REGION-BASED CONVOLUTIONAL NEURAL NETWORK

RELATED APPLICATION DATA

This application claims the benefit of priority of U.S. Provisional Patent Application Ser. No. 62/495,445, filed Sep. 8, 2016, and titled "CMS-RCNN: Contextual Multiscale Region-based CNN Approach to Robust Face Detection," which is incorporated by reference herein in its entirety.

GOVERNMENT RIGHTS

This invention was made with government support under contract W911NF-16C-0040 awarded by the U.S. Army Research Laboratory's Army Research Office. The government has certain rights in the invention.

FIELD OF THE INVENTION

The present invention generally relates to the field of detecting objects in images. In particular, the present invention is directed to methods and software for detecting objects in images using a multiscale fast region-based convolutional neural network.

BACKGROUND

Automated detection of objects within digital images is a technology that has many benefits. For example, automated face detection is useful in access control, surveillance, and security operations, among others. Automated object-detection technology has progressed significantly as computing power has been increased over the years, allowing for faster and faster execution of complex algorithms. Along with increases in processing power has come improvements to object-detection processing architectures.

For example, robust face detection in the wild is one of the ultimate components for supporting various facial related problems, such as unconstrained face recognition, facial periocular recognition, facial landmarking and pose estimation, facial expression recognition, and 3D facial model construction, among others. Although the face-detection problem has been intensely studied for decades, resulting in various commercial applications, it still meets problems in some real-world scenarios due to numerous challenges, including heavy facial occlusions, extremely low resolutions, strong illumination, exceptional pose variations, image or video compression artifacts, etc.

SUMMARY OF THE DISCLOSURE

In one implementation, the present disclosure is directed to a method of processing an image to detect the presence of one or more objects of a desired classification in the image. The method being performed in an object-detection system includes receiving the image and storing it in computer memory; sequentially convolving the image in a series of at least two convolution layers to create a corresponding series of feature maps of differing scales; pooling at least one of the feature maps to create a corresponding at least one pooled feature map; normalizing, relative to one another, the at least one pooled feature map and each of the feature maps not pooled to create a series of normalized feature maps; concatenating the series of normalized feature maps together with one another to create a concatenated feature map; dimensionally reducing the concatenated feature map to create a dimensionally reduced feature map; processing the dimensionally reduced feature map in a first set of fully connected layers to create a proposal comprising a bounding box corresponding to a suspected object of the desired classification in the image and an objectness score for the suspected object, wherein the first set of fully connected layers has been trained on the desired classification; if the objectness score exceeds a predetermined threshold, then projecting the bounding box back to each of the at least two feature maps to identify a region of interest in each of the at least two feature maps; pooling each of the regions of interest to create a corresponding pooled region of interest; normalizing, relative one another, the pooled regions of interest to create a set of normalized regions of interest; concatenating the normalized regions of interest with one another to create a concatenated region of interest; dimensionally reducing the concatenated region of interest to create a dimensionally reduced region of interest; processing the dimensionally reduced region of interest in a second set of fully connected layers to generate a confidence score for the region of interest, wherein the second set of fully connected layers is trained on the desired classification; and storing the bounding box and the confidence score in the computer memory in association with the image.

In another implementation, the present disclosure is directed to a computer-readable storage medium containing computer-executable instructions that, when executed by a computing system, performs a method of processing an image to detect the presence of one or more objects of a desired classification in the image, the method being performed in an object-detection system and comprising: receiving the image and storing it in computer memory; sequentially convolving the image in a series of at least two convolution layers to create a corresponding series of feature maps of differing scales; pooling at least one of the feature maps to create a corresponding at least one pooled feature map; normalizing, relative to one another, the at least one pooled feature map and each of the feature maps not pooled to create a series of normalized feature maps; concatenating the series of normalized feature maps together with one another to create a concatenated feature map; dimensionally reducing the concatenated feature map to create a dimensionally reduced feature map; processing the dimensionally reduced feature map in a first set of fully connected layers to create a proposal comprising a bounding box corresponding to a suspected object of the desired classification in the image and an objectness score for the suspected object, wherein the first set of fully connected layers has been trained on the desired classification; if the objectness score exceeds a predetermined threshold, then projecting the bounding box back to each of the at least two feature maps to identify a region of interest in each of the at least two feature maps; pooling each of the regions of interest to create a corresponding pooled region of interest; normalizing, relative one another, the pooled regions of interest to create a set of normalized regions of interest; concatenating the normalized regions of interest with one another to create a concatenated region of interest; dimensionally reducing the concatenated region of interest to create a dimensionally reduced region of interest; processing the dimensionally reduced region of interest in a second set of fully connected layers to generate a confidence score for the region of interest, wherein the second set of fully connected layers is trained on the desired classification; and storing the bounding box and the confidence score in the computer memory in association with the image.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

I. Overview

Figure 1:
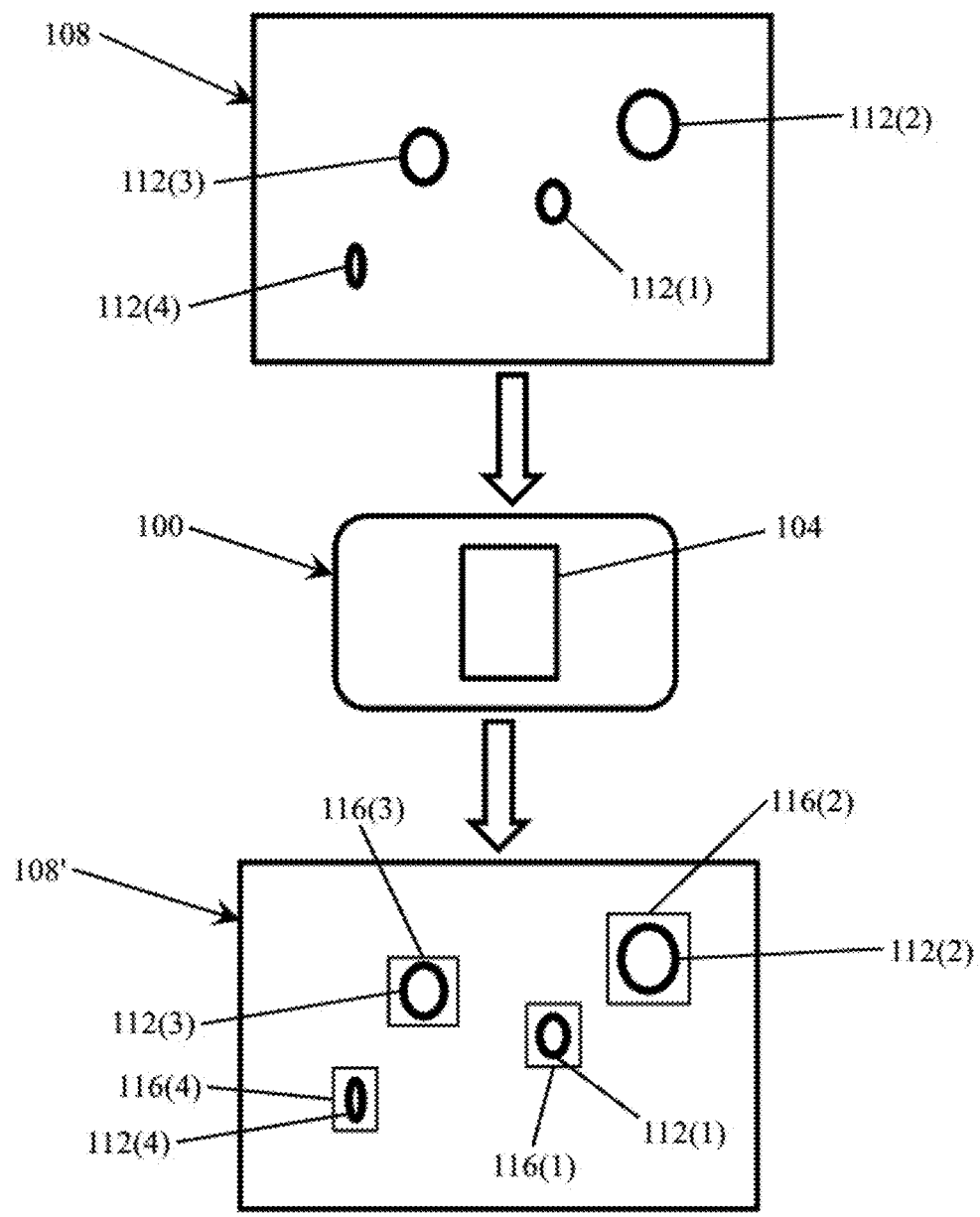
FIG. 1 is a high-level diagram of an object-detection system in accordance with aspects of the present invention illustrating an example input image and a corresponding output image.

In one aspect, the present invention is directed to a Convolutional Neural Network (CNN) based object-detection system capable of detecting occurrence(s) of one or more desired objects within a given input image. Each object may be virtually any object desired to be detected in the image, such as a human face, a particular type of vehicle, or a particular type of weapon, to name just a few. An improvement to object-detection technology afforded by an object-detection system of the present invention is particularly suited for detecting each object even if the object occupies a relatively small portion of the overall image, is poorly or non-uniformly lit, is blurry, and/or is in an off-axis orientation, among other things that make object detection difficult or impossible using traditional object-detection methodologies.

In contrast to conventional CNN-based object-detection methods, a CNN-based object detection method according to the present invention assembles and processes feature maps and regions of interest (ROIs) at multiple scales to increase performance over conventional CNN-based object-detection methods and especially in detecting objects that are relatively small compared to the overall image being processed.

This disclosure describes an advanced CNN (ConvNet) based approach named "Multiple Scale Faster Region-based CNN" (MS-FRCNN) to handle the problem of object detection in digital images that may contain one or more occurrences of each object desired to be found in each image. Due to face detection being a primary use of MS-FRCNN, the examples and experiments described herein are focused on human face detection. However those skilled in the art will readily understand how to apply the principles disclosed herein to virtually any desired type of object.

In one example, the face(s) desired to be detected in digital images are collected under numerous challenging conditions, such as facial occlusions, strong illumination, off-angles, and/or low-resolutions, among others. An example described herein extends the framework of the known Faster R-CNN by allowing it to span the receptive fields in the ConvNet in multiple deep feature maps. In other words, this process helps to synchronize both the global and the local context information for facial feature representation. Therefore, it is able to robustly deal with challenges in the problem of robust face detection. The disclosed method introduces the Multiple-Scale Regional Proposal Network (MS-RPN) to generate a set of region proposals and the Multiple-Scale Region-based Convolutional Neural Network (MS-RCNN) to extract the ROIs of facial regions, and more generally, object regions. A confidence score is then computed for every ROI. A face-detection system of the present disclosure is able to decide the quality of the detection results by thresholding these generated confidence scores in given input images.

The MS-FRCNN approach described herein was evaluated on two challenging face-detection databases and compared against numerous recent face detection methods. Firstly, the example of the disclosed MS-FRCNN method is compared against the standard Faster R-CNN method in the problem of face detection. It is evaluated on the Wider Face database, a large scale face detection benchmark dataset, to show its capability to detect face images in the wild, for example, under occlusions, illumination, facial poses, and/or low-resolution conditions, among others. It is also benchmarked on the known Face Detection Data Set and Benchmark (FDDB), a dataset of face regions designed for studying the problem of unconstrained face detection. The experimental results show that the disclosed MS-FRCNN approach consistently achieves highly competitive results against the other state-of-the-art face detection methods.

The following disclosure is organized as follows. Section II summarizes related work in face detection and summarizes and describes limitations thereof. Section III introduces an example MS-FRCNN approach to the problem of robust face detection. Section IV presents experimental face detection results and comparisons obtained using the disclosed proposed approach on two challenging face detection databases, i.e., the Wider Face and the FDDB databases.

II. Related Work and its Limitations

Face detection has been a well-studied area of computer vision. One of the first well-performing approaches to the problem was the Viola-Jones face detector. It was capable of performing realtime face detection using a cascade of boosted simple Haar classifiers. The concepts of boosting and using simple features has been the basis for many different approaches since the Viola-Jones face detector. These early detectors tended to work well on frontal face images but not very well on faces in different poses. As time has passed, many of these methods have been able to deal with off-angle face detection by utilizing multiple models for the various poses of the face. This increases the model size but does afford more practical uses of the methods. Some approaches have moved away from the idea of simple features but continue to use the boosted learning framework. For example, others have used SURF cascades for general object detection but also showed good results on face detection.

More recent work on face detection has tended to focus on using different models such as a Deformable Parts Model (DPM). Some have combined the problems of face detection, pose estimation, and facial landmarking into one framework. By utilizing all three aspects in one framework, those frameworks were able to outperform the state-of-the-art at the time on real world images. Others extended this work by incorporating group sparsity in learning in which landmarks are the most salient for face detection as well as incorporating 3D models of the landmarks in order to deal with pose. Still others have combined ideas from both of these approaches by utilizing a cascade detection framework while simultaneously localizing features on the face for alignment of the detectors. Similarly, others have been able to use hierarchical DPMs not only to achieve good face detection in the presence of occlusion but also landmark localization. However, yet others were able to show that both DPM models and rigid template detectors similar to the Viola-Jones detector have a lot of potential that has not been adequately explored. By retraining these models with appropriately controlled training data, they were able to create face detectors that perform similarly to other, more complex state-of-the-art face detectors.

All of these approaches to face detection were based on selecting a feature extractor beforehand. However, there has been work done in using a ConvNet to learn which features are used to detect faces. Neural Networks have been around for a long time but have been experiencing a resurgence in popularity due to hardware improvements and new techniques resulting in the capability to train these networks on large amounts of training data. One group utilized a cascade of CNNs to perform face detection. The cascading networks allowed them to process different scales of faces at different levels of the cascade while also allowing for false positives from previous networks to be removed at later layers in a similar approach to other cascade detectors. Another group approached the problem from a different perspective more similar to a DPM approach. In their method, the face is broken into several facial parts such as hair, eyes, nose, mouth, and beard. By training a detector on each part and combining the score maps intelligently, they were able to achieve accurate face detection, even under occlusions. Both of these methods require training several networks in order to achieve their high accuracy. The methods of the present disclosure, on the other hand, can be trained as a single network, end-to-end, allowing for less annotation of training data needed while maintaining highly accurate face detection.

The recent studies in deep ConvNets have achieved significant results in object detection, classification and modeling. This section reviews various well-known Deep ConvNets. Then, this section shows the current limitations of the Faster R-CNN, one of the state-of-the-art deep ConvNet methods in object detection, in the defined context of the face detection.

II. 1. Deep Learning Framework

Convolutional Neural Networks are biologically inspired, and its extensions, such as, LeNet-5, HMAX, etc., imitate the characteristics of animal visual cortex systems that contain a complex arrangement of cells sensitive to receptive fields. In their models, the designed filters are considered as human visual cells in order to explore spatially local correlations in natural images. It efficiently presents the sparse connectivity and the shared weights since these kernel filters are replicated over the entire image with the same parameters in each layer. In addition, the pooling step, a form of down-sampling, plays a key role in ConvNet. Max-pooling is a popular pooling method for object detection and classification, since max-pooling reduces computation for upper layers by eliminating non-maximal values and provides a small amount of translation invariance in each level.

Although ConvNets can explore deep features, they are very computationally expensive. The algorithm becomes more practical when implemented in a Graphics Processing Unit (GPU). The known Caffe framework is currently one of the fastest deep learning implementations using CUDA C++ for GPU computation. It also supports interfaces to Python/Numpy and MATLAB. It can be used as an off-the-shelf deployment of the state-of-the-art models. This framework was employed in the experiments described below.

II. 2. Region-Based Convolution Neural Networks

One of the most important approaches for the object detection task is the family of Region-based Convolution Neural Networks (R-CNN). The first generation of this family, R-CNN, applies the high-capacity deep ConvNet to classify given bottom-up region proposals. Due to the lack of labeled training data, it adopts a strategy of supervised pre-training for an auxiliary task followed by domain-specific fine-tuning. Then the ConvNet is used as a feature extractor and the system is further trained for object detection with Support Vector Machines (SVM). Finally, it performs bounding-box regression. The method achieves high accuracy but is very time-consuming. The system takes a long time to generate region proposals, extract features from each image, and store these features in a hard disk, which detection process takes 47 s per one image using a VGG-16 network implemented in GPU due to the slowness of feature extraction.

R-CNN is slow because it processes each object proposal independently without sharing computation. Fast R-CNN solves this problem by sharing the features between proposals. The network is designed to only compute a feature map once per image in a fully convolutional style, and to use ROI-pooling to dynamically sample features from the feature map for each object proposal. The network also adopts a multitask loss, i.e., a classification loss and a bounding-box regression loss. Based on the two improvements, the framework is trained end-to-end. The processing time for each image significantly reduced to 0.3 s.

Fast R-CNN accelerates the detection network using the ROI-pooling layer. However the region proposal step is designed out of the network hence still remains a bottleneck, which results in sub-optimal solution and dependence on the external region proposal methods. Faster R-CNN addresses the problem with Fast R-CNN by introducing the Region Proposal Network (RPN). An RPN is implemented in a fully convolutional style to predict the object bounding boxes and the objectness scores. In addition, the anchors are defined with different scales and ratios to achieve the translation invariance. The RPN shares the full-image convolution features with the detection network. Therefore the whole system is able to complete both proposal generation and detection computation within 0.2 s using very deep VGG-16 model. With a smaller ZF model, it can reach the level of real-time processing.

II. 3. Limitations of Faster R-CNN

The Region-based CNN family, for example, Faster R-CNN and its variants, achieves the state-of-the-art performance results in object detection on the PASCAL VOC dataset. These methods can detect objects such as vehicles, animals, people, chairs, and etc. with very high accuracy. In general, the defined objects often occupy the majority of a given image. However, when these methods are tested on the challenging Microsoft COCO dataset, the performance drops a lot, since images contain more small, occluded and incomplete objects. Similar situations happen in the problem of face detection. Some instantiations of methods of the present disclosure focus on detecting only facial regions that are sometimes small, heavily occluded and of low resolution.

The detection network in Faster R-CNN is unable to robustly detect such tiny faces. The intuition point is that the Regions of Interest pooling layer, i.e. ROI-pooling layer, builds features only from the last single high level feature map. For example, the global stride of the "conv5" layer in the VGG-16 model is 16. Therefore, given a facial region with the sizes less than 16×16 pixels in an image, the projected ROI-pooling region for that location will be less than 1 pixel in the "conv5" layer, even if the proposed region is correct. Thus, the detector will have much difficulty to predict the object class and the bounding box location based on information from only one pixel.

III. Detailed Example of MS-FRCNN

This section presents an example MS-FRCNN approach to robustly detect desired-object regions, here facial regions for the sake of illustration. This example utilizes the deep features encoded in both the global and the local representation for facial regions. Since the values of the filter responses range in different scales in each layer, i.e., the deeper a layer is, the smaller values of the filter responses are, there is a need for a further calibration process to synchronize the values received from multiple filter responses. The average feature for layers in Faster-RCNN are employed to augment features at each location.

III. 1. Deep Network Architecture

In problems of face detection, the sizes of human faces in observed images are usually collected under low-resolutions, large occlusions, and strong lighting conditions. It is a difficult task for the standard Faster R-CNN to robustly detect these facial regions. It is because the receptive fields in the last convolution layer (conv5) in the standard Faster R-CNN is quite large. For example, given a facial ROI region of sizes of 64×64 pixels in an image, its output in conv5 contains only 4×4 pixels, which is insufficient to encode informative features. When the convolution layers go deeper, each pixel in the corresponding feature map gather more convolutional information outside the ROI region. Thus, it contains higher proportion of information outside the ROI region if the ROI is very small. The two problems together make the feature map of the last convolution layer less representative for small ROI regions.

The present inventors recognized that combining both global and local features, i.e., features at multiple scales, to enhance the global and local information in the Faster RCNN model can help robustly detect facial regions. In order to enhance this capability of the network, the methodology incorporates feature maps from shallower convolution feature maps, for example, from conv3 and conv4 of the Faster RCNN method, to the convolution feature map from a deeper feature map, for example from conv5 of the Faster RCNN method, for ROI pooling. Therefore, the network can robustly detect lower level facial features containing higher proportion of information in ROI regions.

In one embodiment, the defined network includes 13 convolution layers initialized using the pre-trained VGG-16 model. Right after each convolution layer, there is a Rectified Linear Unit (ReLU) layer. However, in this embodiment, only 4 of these layers are followed by pooling layers that shrink the spatial scale. The convolution layers in this embodiment are divided into 5 major parts, i.e., conv1, conv2, conv3, conv4, and conv5, each containing 2 or 3 convolution layers, e.g. "conv5_3". All of the convolution layers in this particular embodiment are shared between the MS-RPN and the MS-RNN. When there are three convolution layers of each network, here, conv3_3, conv4_3, and conv5_3, their outputs are also used as the inputs to three corresponding ROI pooling layers and normalization layers. These L-2 normalization outputs are concatenated and shrunk to use as the inputs for the next network layers.

III. 2. Multiple Scale Normalization

In the deep-network architecture disclosed herein, features extracted from different convolution layers cannot be simply concatenated, because the overall differences of the numbers of channels, scales of values, and norms of feature map pixels among these layers. Detailed research shows that deeper layers often contain smaller values than shallower layers. Therefore, the larger values will dominate the smaller ones, making the system rely too much on shallower features rather than a combination of multiple scale features causing the system to no longer be robust.

In order to solve this problem, the methodology of the present disclosure introduces a normalization layer to the CNN architecture. The system takes the multiple scale features and applies a normalization, such as L2 normalization, along the channel axis of each feature map. Then, since the channel size is different among layers, the normalized feature map from each layer needed to be re-weighted so that their values are at the same scale. After that, the feature maps are concatenated to one single feature map tensor. This modification helps to stabilize the system and increase the accuracy. Then, the channel size of the concatenated feature map is shrunk to fit right in the original architecture for the downstream fully-connected layers.

III. 3. Deep Network Implementation

At a high level and in one example, before normalization all feature maps are synchronized to the same size so that concatenation can be applied. In the RPN, shallower feature maps are followed by pooling layers with certain stride to perform down-sampling. In the detection network, the ROI pooling layers already ensure that the pooled feature maps are at the same size. In this example, the implementation of an L2 normalization layer updates the re-weighting factor for each feature map during training. In a particular example architecture of an object-detection system of the present disclosure, feature maps are combined from three layers, here, "conv3," "conv4," and "conv5" of the convolution layers. The object-detection system normalized them independently, re-weights them, and concatenates them. The initial value for the re-weighting factor needs to be set carefully to make sure the downstream values are at reasonable scales when training is initialized.

Additionally, in order to shrink the channel size of the concatenated feature map, a 1×1 convolution layer is then employed. Therefore the channel size of final feature map is at the same size as the original fifth convolution layer in Faster-RCNN. The foregoing general features and aspects are described below in more detail in conjunction with illustrative figures.

Figure 3:
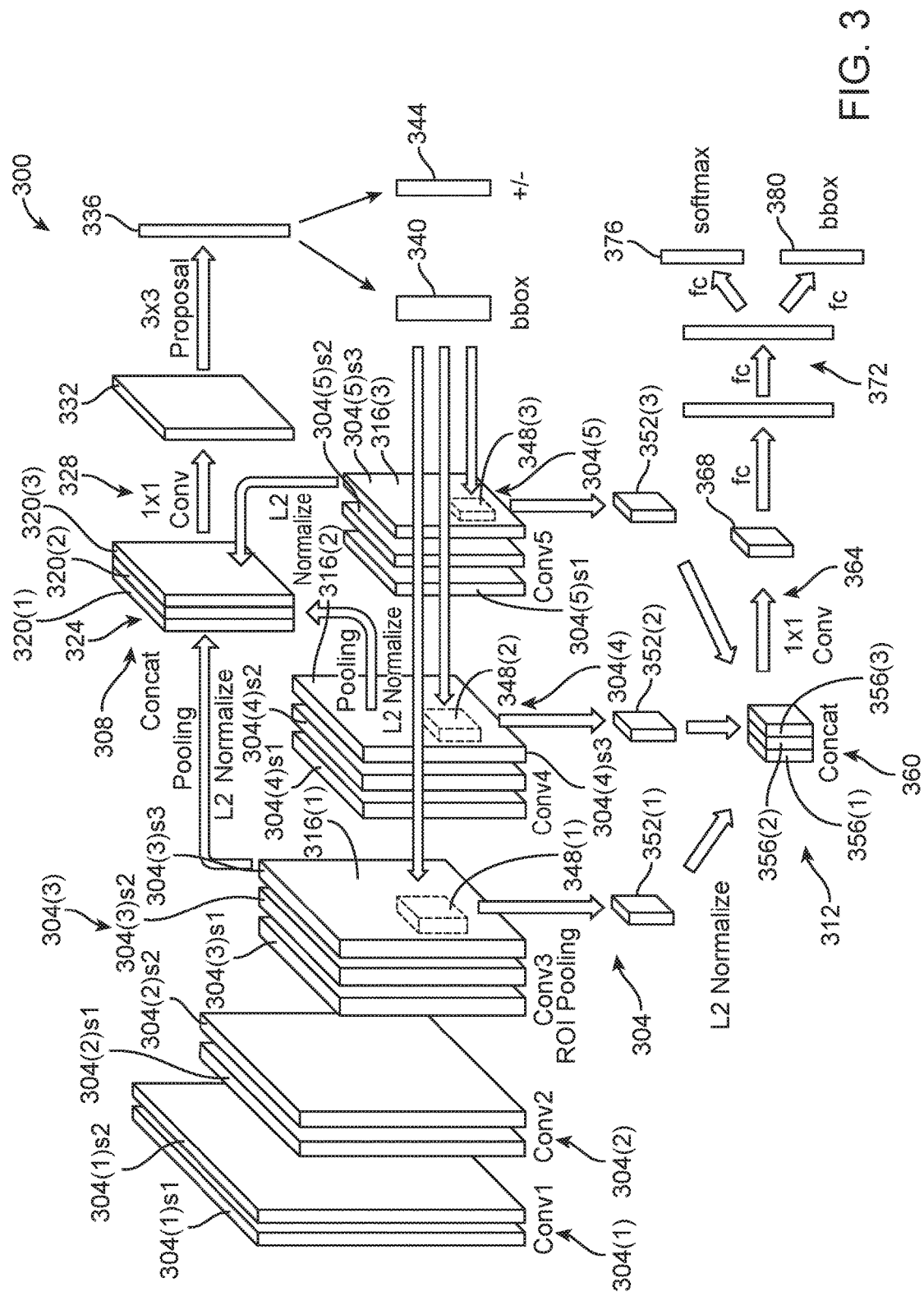
FIG. 3 is a diagram illustrating an architecture of an object-detection process in accordance with the present disclosure.

Referring now to the drawings, FIG. 1 illustrates an example object-detection system 100 made in accordance with the present invention. At a high level, object-detection system 100 is designed and configured to execute an object-detection process 104 based on a convolutional neural network architecture, an example of which is illustrated in FIG. 3 and described in detail below. Object-detection system 100 is trained to detect each occurrence of one or more objects within an input image, here input image 108. For the sake of simplicity, the object(s) that object-detection system 100 detects are of a single desired classification, such as a human face, a particular type of vehicle, or a particular type of weapon, among others. In more complex versions, object-detection system 100 may be trained to detect multiple classes of objects. In the example shown in FIG. 1, input image 108 contains at least one occurrence of a single class of objects, here multiple occurrences 112(1) to 112(4) of a single class of objects (each designated "O" in FIG. 1 in varying sizes and aspect ratios), wherein the sizes of the occurrences vary from one to another, with occurrence 112(4) being relatively small, as indicated by the relative sizes of the "O"s and corresponding bounding boxes 116(1) to 116(4) in an output version 108' of input image 108, which may be augmented with visible representations of the bounding boxes and/or confidence scores (not shown). It is noted that although bounding boxes 116(1) to 116(4) in this example are shown as being rectangular in shape, a bounding box in another embodiment can be any desired shape, such as circular, oval, triangular, pentagonal, trapezoidal, etc. As those skilled in the art will readily appreciate, input image 108 may be any suitable type of digital image, such as a digital or digitized photographic image, a digital or digitized frame of a video or film, a digital scanned image, among others. It is noted that input image 108 may be a portion of a larger image that has been selected for object detection a priori.

Figure 2A:
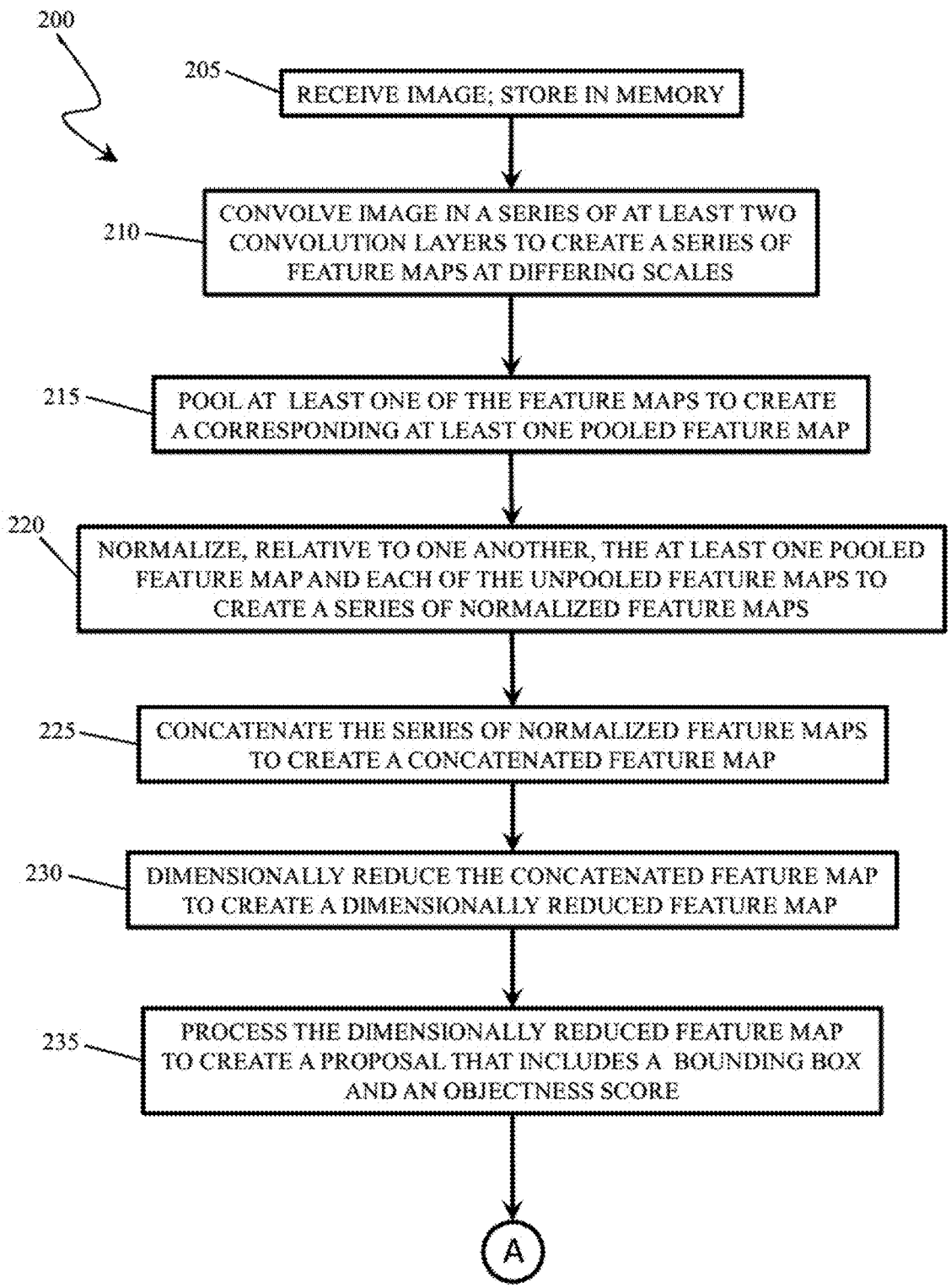
FIGS. 2A-2C depict a flow diagram of an example method of processing an image to detect within the image an object of a desired classification.
Figure 2B:
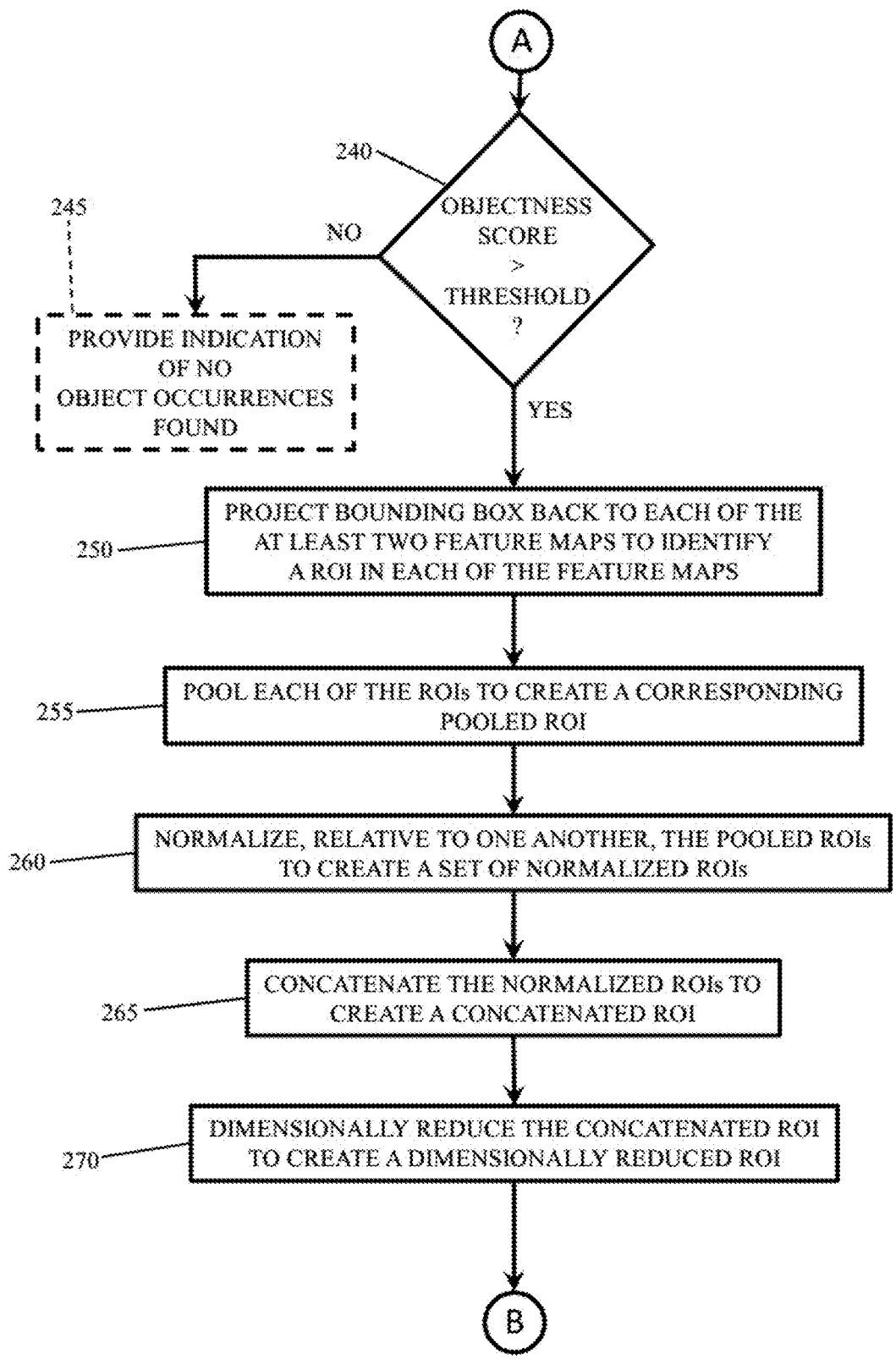
Figure 2C:
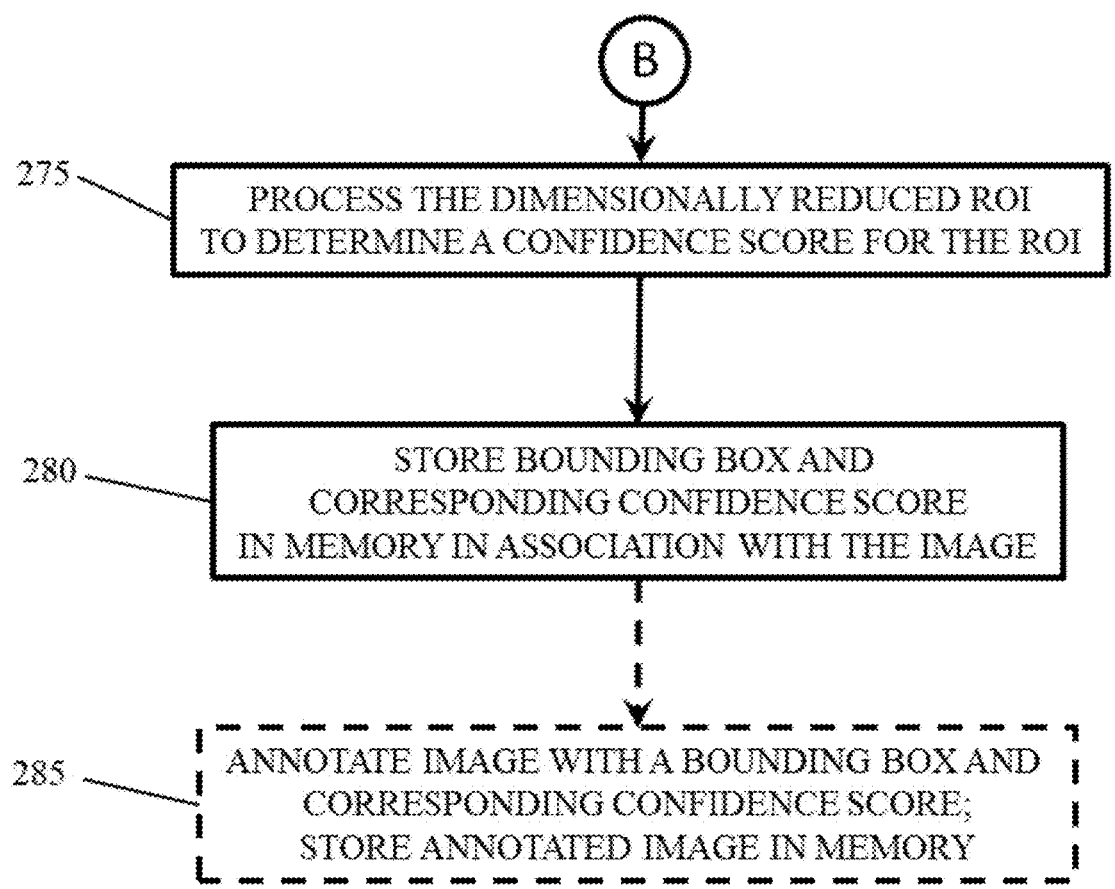
Figure 7:
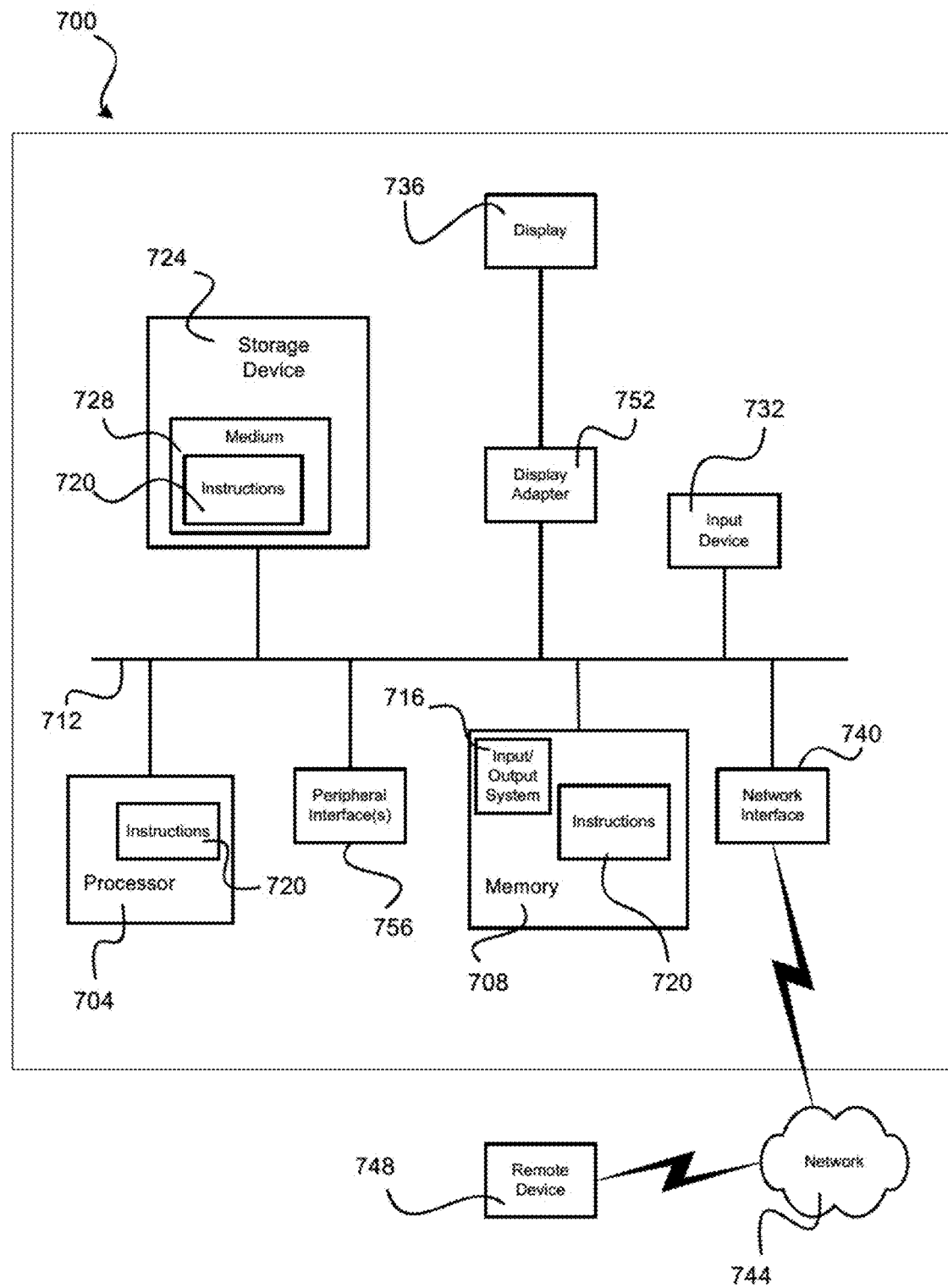
FIG. 7 is a block diagram of a computing system that can contain and/or be used to implement any one or more of the MS-FRCNN methodologies disclosed herein.

Referring to FIGS. 2A-2C, and also occasionally to FIG. 1, FIGS. 2A-2C illustrate an example method 200 of processing an image, such as image 108, to detect within the image an occurrence of an object of a desired classification. Method 200 may begin at step 205 by an object-detection system, such as object-detection system 100 of FIG. 1, receiving an image, such as image 108, and storing it in computer memory. While a computing system is not depicted in FIG. 1, those skilled in the art will readily understand that an object-detection system, such as object-detection system 100 of FIG. 1, is a combination of 1) software suitably coded to perform at least the functions described herein and any other complementary and supplementary functions needed to create a fully functional object-detection system and 2) hardware designed and configured to execute such software. Suitable hardware for executing such software is ubiquitous in this day in age, such that a description of even one set of hardware is not needed for those skilled in the art to carry out the present invention. That said, some basic examples of suitable hardware include, but are not limited to, a general purpose computing device (e.g., laptop, desktop, tablet, smartphone, server, mainframe, supercomputer), one or more networks of general purpose computing devices, an application-specific computing device or network of such devices, among many others. Such computing devices may each include one or more GPUs to aid in computations, one more central processing units, and/or one or more application-specific processing units, such as one or more application-specific integrated circuits, one or more systems on chip, and/or one or more field-programmable gate arrays, among others. Fundamentally, there are no limitations on the software and computing hardware as long as they are compatible and are able to provide the requisite functionality. For the sake of convenience, any machine memory needed for providing the requisite functionality is referred to herein as "computer memory." Computer memory includes both non-volatile and volatile memory of any known type. FIG. 7 illustrates one example of a computing system 700 that could form all or part of the computing hardware needed to provide a fully functional object-detection system.

At step 210, the object-detection system sequentially convolves the image in a series of at least two convolution layers to create a corresponding series of feature maps of differing scales. Generally, the at least two convolution layers are part of a CNN modeled in the object-detection system. As alluded to above, CNNs are well known in the art and need not be described in detail herein for those skilled in the art to practice the present invention to its fullest scope. It is noted that while at least two convolutional layers are needed for steps of method 200 that follow, in practice, more robust object-detection system of the present invention will typically include more than two convolutional layers. In addition, each convolution layer may include multiple convolution sublayers. As an example, FIG. 3 illustrates an example architecture 300 for an object-detection process that includes five convolution layers 304(1) to 304(5), some of which have two convolution sublayers and some of which have three convolution sublayers. Those skilled in the art will readily understand how to build a suitable CNN containing the at least two convolution layers required for step 210, including, but not limited to, selecting convolution parameters, one or more activation functions, and one or more pooling functions, and configuring the fully-connected layer(s) that make decisions. Those skilled in the art will also readily appreciate that, prior to performing step 210, the at least two convolution layers will have been a priori trained with appropriate training images.

At step 215, the object-detection system pools at least one of the feature maps to create a corresponding at least one pooled feature map. The pooling may be any suitable pooling such as max pooling, average pooling, etc. In some embodiments, each of fewer than all of the at least two feature maps may be pooled. For example, only the feature map(s) from the shallowest or shallower convolution layers are pooled. In other embodiments, all of the feature maps selected for normalization and concatenation (see steps 220 and 225) may be pooled.

At step 220, the object-detection system normalizes, relative to one another, each of the at least one pooled feature map and each feature map not pooled to create a series of normalized feature maps. Generally, normalization ensures that the content(s) of one or more (pooled) feature maps is/are not favored over the content(s) of one or more other of the (pooled) feature maps. Normalization can be accomplished using a suitable norm function, such as the L2 norm function or the L1 norm function, among others. At step 225, the object-detection system concatenates the series of normalized feature maps to create a concatenated feature map, and at step 230, the object-detection system dimensionally reduces the concatenated feature map to create a dimensionally reduced feature map. Dimensional reduction at step 230 may be performed using any suitable dimension reducing technique, such as a 1×1 convolution.

At step 235, the object-detection system processes the dimensionally reduced feature map in a first set of one or more fully connected layers to create a proposal that comprises 1) a bounding box corresponding to a suspected object of the desired classification in the image and 2) an objectness score for the suspected object. As those skilled in the art will readily appreciate, when step 235 is executed, the first set of fully connected layers will have been trained on the desired classification using known neural network training techniques. It is noted that the bounding box will typically be rectangular for problem simplification. However, the shape of the bounding box need not be rectangular. The objectness score may represent the relative probability that the suspected object within the bounding box is actually a member of the desired class. Those skilled in the art will readily understand how to configure the set of fully connected layers to generate the bounding box and determine the objectness score, as these functions can be configured similarly to known like functions from conventional RPNs.

It is noted that steps 210 to 235 may be considered to be steps within a MS-RPN, which may be generally similar to conventional RPNs. However, a MS-RPN is much more robust than conventional RPNs by virtue of the use of multiple feature maps of differing scale and the attendant normalization and concatenation.

At step 240, the object-detection system determines whether or not the objectness score exceeds a predetermined threshold. The predetermined threshold may be a learned value from training. If at step 240 the objectness score does not exceed the threshold, at step 245 the object-detection system may provide an indication that it has not found any objects of the desired classification within the image. Such indication may be of any suitable type, such as a message displayed to a user on an electronic display, a flag sent to another software application, or marking on the image, among many other possibilities. However, if at step 240 the objectness score exceeds the predetermined threshold, at step 250 the object-detection system projects the bounding box back to each of the at least two feature maps of differing scale to identify a ROI in each of the at least two feature maps.

At step 255, the object-detection system pools each of the ROIs to create a corresponding pooled ROI. The pooling may be any suitable pooling such as max pooling, average pooling, etc. At step 260, the object-detection system normalizes, relative to one another, the pooled ROIs to create a set of normalized ROIs. Generally, normalization ensures that the content of any of the pooled ROIs is not favored over the content of any other of the pooled ROIs. Normalization can be accomplished using a suitable norm function, such as the L2 norm function or the L1 norm function, among others. At step 265, the object-detection system concatenates the series of normalized ROIs to create a concatenated ROI, and at step 270, the object-detection system dimensionally reduces the concatenated ROI to create a dimensionally reduced ROI. Dimensional reduction at step 270 may be performed using any suitable dimension-reducing technique, such as a 1×1 convolution.

At step 275, the object-detection system processes the dimensionally reduced ROI in a second set of fully connected layers to determine a confidence score for the ROI. As those skilled in the art will readily appreciate, when step 275 is executed, the second set of fully connected layers will have been trained on the desired classification using known neural network training techniques. Any suitable classifier, such as a softmax classifier, can be used for determining the confidence score for the presence of an object of the desired classification.

At step 280, the object-detection system may store the bounding box and corresponding confidence score in memory in association with the input image. This information may be stored in any one or more of a variety of ways, such as metadata for the image and/or, as illustrated at step 285, the object-detection system may annotate the image with a visual depiction of the bounding box and the corresponding confidence score and store the image and the annotations in the computer memory. The object-detection system may perform other operations at step 280, such as displaying a message to a user on a visual display, issue a flag, and/or display the image annotated with the bounding box to the user, among other things.

It is noted that steps 255 to 275 may be considered to be steps within a MS-FRCNN, which may be generally similar to conventional Faster RCNNs. However, MS-FRCNN is much more robust than conventional Faster RCNNs by virtue of the use of multiple ROIs of differing scale and the attendant normalization and concatenation. In addition, it is noted that the at least two convolution layers mentioned above will typically be shared between the MS-RPN and MS-FRCNN. Alternatively, the at least two convolution layers may be dedicated only to the MS-RPN, with a corresponding at least two separate and distinct convolution layers of the same scales being dedicated to the MS-FRCNN. It is further noted that while method 200 is directed to detecting objects of only one classification, those skilled in the art will readily understand how to modify the method to detect multiple classifications of objects. Similarly, while method 200 is described above as only detecting a single occurrence of an object of the desired classification or no such occurrence, the method can detect multiple occurrences of the desired classification within the image, if the image contains such multiple occurrences, or at least appears to the object-detection system to contain such multiple occurrences.

As mentioned above, FIG. 3 illustrates an example CNN-based architecture 300 for an object-detection system of the present invention. It is noted that architecture 300 is not complete, as only salient features and aspects are illustrated for simplicity. Those skilled in the art will readily be able to augment architecture 300 as needed to implement a fully functional object-detection system that functions in accordance with the present disclosure. For example, those skilled in the art will readily understand how to implement an input layer, activation layers (e.g., rectified linear unit (ReLU) layers), pooling layers, fully connected neural network layers, one or more output layers, etc.), as those features are well known in the art of neural networks generally and visual-learning neural networks more specifically. In this vein and as noted above, those skilled in the art will readily understand how to build a suitable object-detection system based on architecture, including, but not limited to, selecting convolution parameters, selecting one or more activation functions, selecting one or more pooling functions, and configuring the fully-connected layer(s) that make decisions. Those skilled in the art will also readily understand the processes for training a CNN-based object-detection system of the present invention.

In this example, architecture 300 includes a CNN 304 that is shared between an MS-RPN 308 and an MS-FRCNN 312. In this example, CNN 304 includes five groups of convolution layers 304(1) to 304(5), with each of the layer groups 304(1) and 304(2) including two convolution layers 304(1)

s1, 304(1)s2 and 304(2)s1, 304(2)s2, respectively, and each of the layer groups 304(3) to 304(5) including three convolution layers 304(3)s1, 304(3)s2, 304(3)s3, and 304(4)s1, 304(4)s2, 304(4)s3 and 304(5)s1, 304(5)s2, 304(5)s3, respectively. Convolution layers 304(3)s3, 304(4)s3, and 304(5)s3 produce a corresponding set of feature maps 316(1) to 316(3) of sequentially reducing scale.

In this example, MS-RPN 308 is configured to pool feature maps 316(1) and 316(2) of shallower convolution layers 304(3) and 304(4) using a suitable pooling function, whereas the MS-RPN does not pool feature map 316(3) from deeper convolution layer 304(5). This is so in this example because feature maps 316(1) and 316(2) are downscaled such that they have the same spatial resolution as feature map 316(3). However, in other embodiments, more or fewer of feature maps 316(1) to 316(3) may be pooled as desired in a particular design. Pooled feature maps (not shown) and feature map 316(3) are normalized relative to one another to create normalized feature maps 320(1) to 320(3). As noted above relative to method 200, any suitable pooling function, such as max pooling, and any suitable norm function, such as an L2 norm function, can be used. The normalized feature maps 320(1) to 320(3) are concatenated with one another to form a concatenated feature map 324, which is then dimensionally reduced, for example, using a 1×1 convolution 328, to obtain a dimensionally reduced feature map 332. In this example, dimensionally reduced feature map 332 is then processed to extract features from a 3×3 local region, here using a suitable 3×3 kernel, to highlight features present in dimensionally reduced feature map to propose a feature vector 436 for each spatial location in feature map 432. Highlighted feature vector 336 is then processed by fully connected layers (not shown) to determine one or more bounding boxes (only one bounding box 340 shown), each of which is suspected to contain an occurrence of an object agnostic to class (e.g., human face, chair, vehicle, weapon, etc.). The fully connected layers also determine an objectness score 344 for each bounding box 340 they have identified.

Each bounding box, here just bounding box 340, suspected of containing an occurrence of the desired class, is then projected back to each of feature maps 316(1) to 316(3) on convolution layers 304(3)s3 to 304(5)s3. This back-projecting is used to isolate a corresponding ROI 348(1) to 348(3) in each of feature maps 316(1) to 316(3). Based on bounding box 340, each of these ROIs 348(1) to 348(3) is suspected to contain an occurrence of an object of the desired class. ROIs 348(1) to 348(3) are pooled to create pooled ROIs 352(1) to 352(3), which are then normalized to create normalized ROIs 356(1) to 356(3). Any suitable pooling and normalization functions can be used, such as max pooling and L2 normalization, among others. Normalized ROIs 356(1) to 356(3) are concatenated with one another to form a concatenated ROI 360, which is then dimensionally reduced, for example, using a 1×1 convolution 364, to obtain a dimensionally reduced ROI 368. In this example, dimensionally reduced ROI 368 is then processed by fully connected layers 372 (also indicated by "fc") to determine a confidence score 376 for the suspected occurrence of the object in the dimensionally reduced ROI. The fully connected layers may also determine a bounding box 380 based on the fully connected layer processing of dimensionally reduced ROI 368.

IV. Experimental Results

This section presents the face detection benchmarking in an exemplary instantiation of the MS-FRCNN approach described herein on the known Wider Face database and the Face Detection Data Set and Benchmark (FDDB). Section IV.1 below presents the training steps on the Wider Face database. Section IV.2 below compares the face detection results using MS-FRCNN and Faster R-CNN on the Wider Face database. Section IV.3 evaluates the present instantiation of MS-FRCNN against other recently published face detection methods on the Wider Face database. In Section IV.4, the present instantiation of MS-FRCNN is also evaluated on the challenging FDDB face database.

IV. 1. Training Data

The Wider Face is a public face detection benchmark dataset. It contains 393,703 labeled human faces from 32,203 images collected based on 61 event classes from the Internet. The database has many human faces with a high degree of pose variations, large occlusions, low-resolutions, and strong lighting conditions. The images in this database are organized and split into three subsets, namely, training, validation, and testing subsets. Each subset contains 40%, 10%, and 50%, respectively, of the original databases. The images and the ground-truth labels of the training and the validation sets are available online for experiments. However, in the testing set, only the testing images (not the ground-truth labels) are available online. All detection results are sent to the database server for evaluating and receiving the Precision-Recall curves.

In the experiments, the proposed MS-FRCNN was trained on the training set of the Wider Face dataset containing 159,424 annotated faces collected in 12,880 images. The trained models on this database were used in testing in the following experiments.

IV. 2. MS-FRCNN vs. Faster R-CNN in Face Detection

Figure 4:
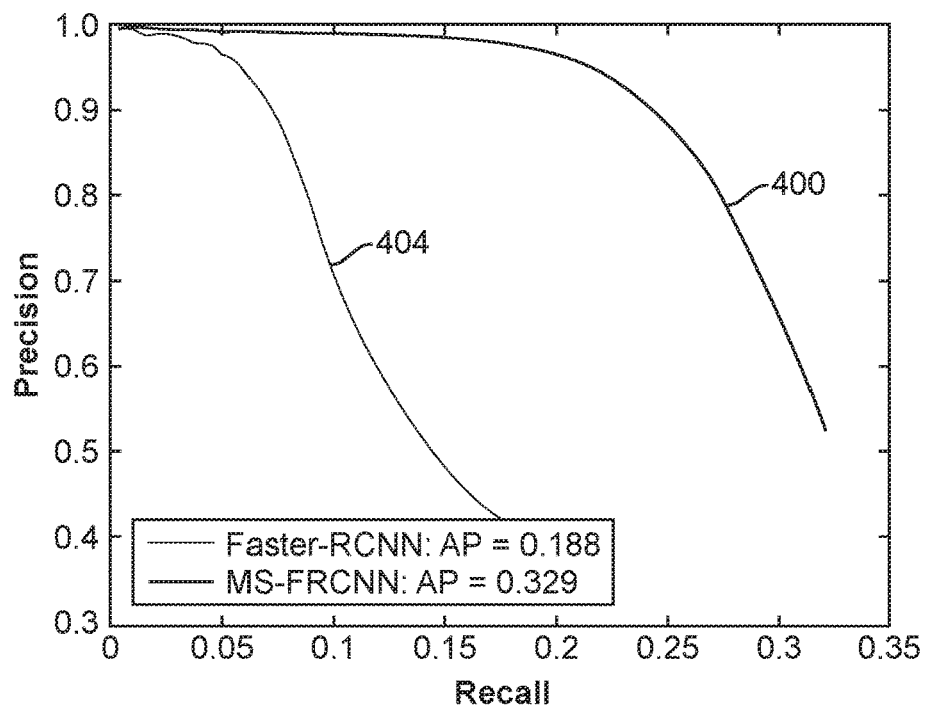
FIG. 4 is a graph of precision versus recall for each of the present MultiStage Faster Regional Convolutional Neural Network (MS-FRCNN) method and the known Faster RCNN method.

In this experiment, the face detection capabilities were compared using the presently disclosed MS-FRCNN approach and the known Faster RCNN. Both methods were trained on the same training set as noted in Section IV.1. In addition, both methods performed under the same conditions. Precision-Recall curves 400, 404 for, respectively, the MS-FRCNN and the Faster R-CNN in the problem of face detection are shown in FIG. 4. As seen in FIG. 4, the presently disclosed MS-FRCNN method (curve 400) strongly outperforms the Faster R-CNN (curve 404) in the problem of face detection in both the precision and the recall values. The MS-FRCNN method achieves the Average Precision (AP) value of 0.329 while the Faster R-CNN has the AP value of 0.188. This experiment shows that the MS-FRCNN provides a more appropriate deep model to solve the problem of unconstrained face detection under various challenging conditions. In at least one example in the experiment, the proposed MS-FRCNN consistently generated ROIs among a human face candidate while the Faster R-CNN had many ROIs confusing the classifier.

IV. 3. Face Detection on Wider Face Database

Figure 5A:
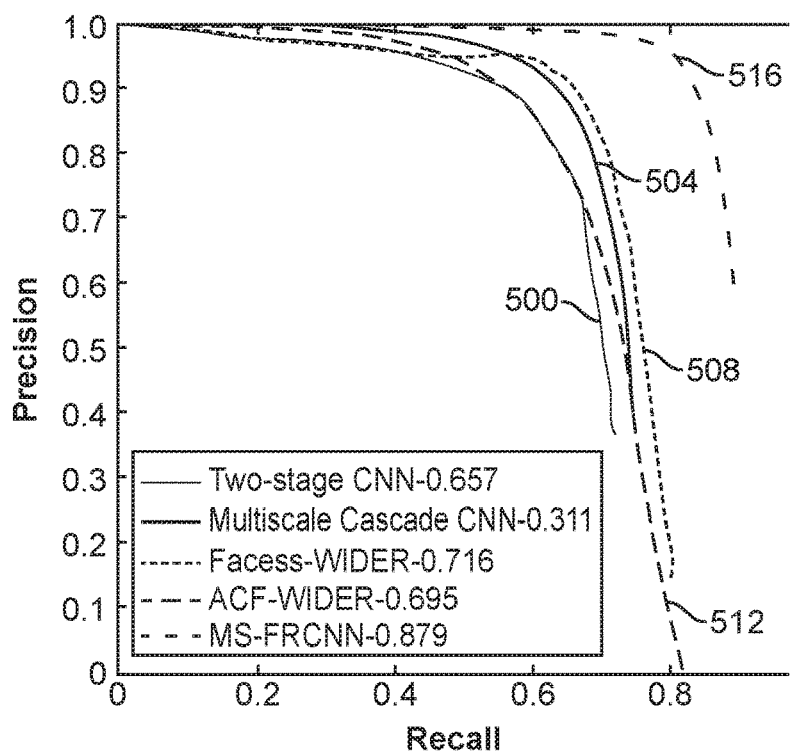
FIGS. 5A to 5C are graphs of precision versus recall for, respectively, easy, medium, and hard difficulty levels of detection for the tested MS-FRCNN method, the two-stage CNN method, the Multiscale Cascade CNN method, the Faceness method, and the Aggregate Channel Features method.
Figure 5B:
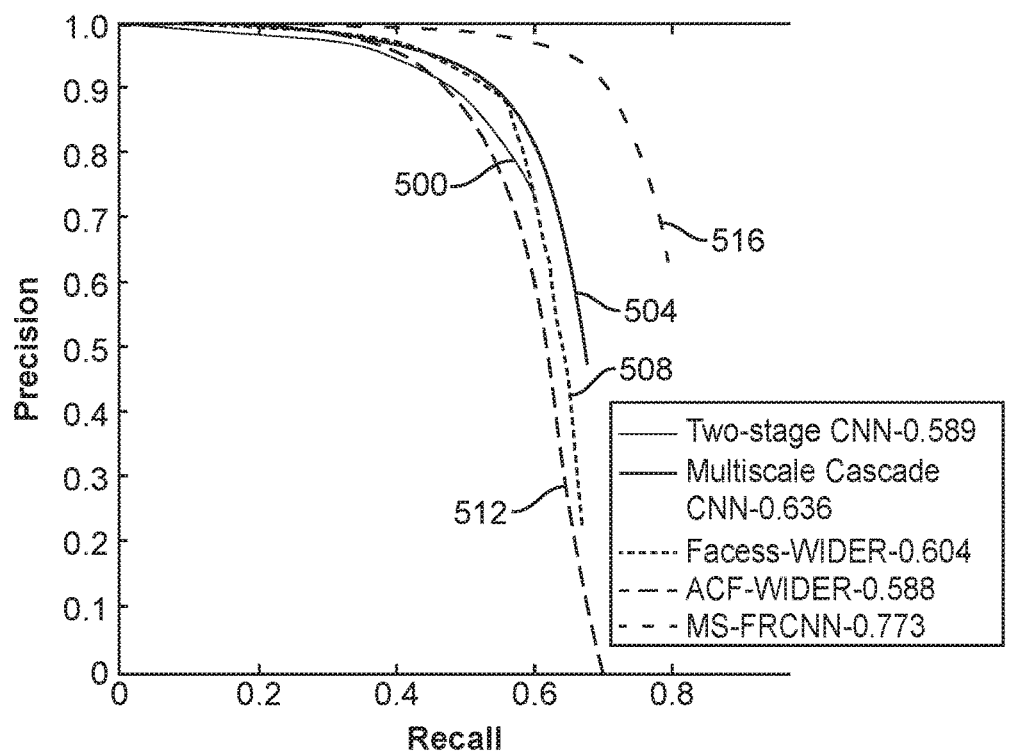
Figure 5C:
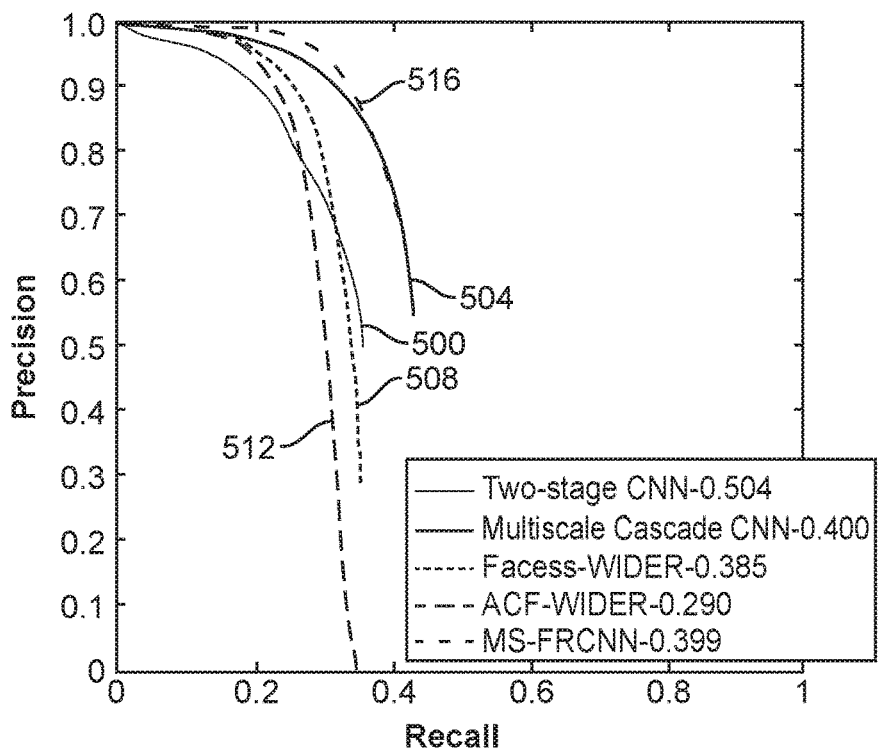
Figure 6:
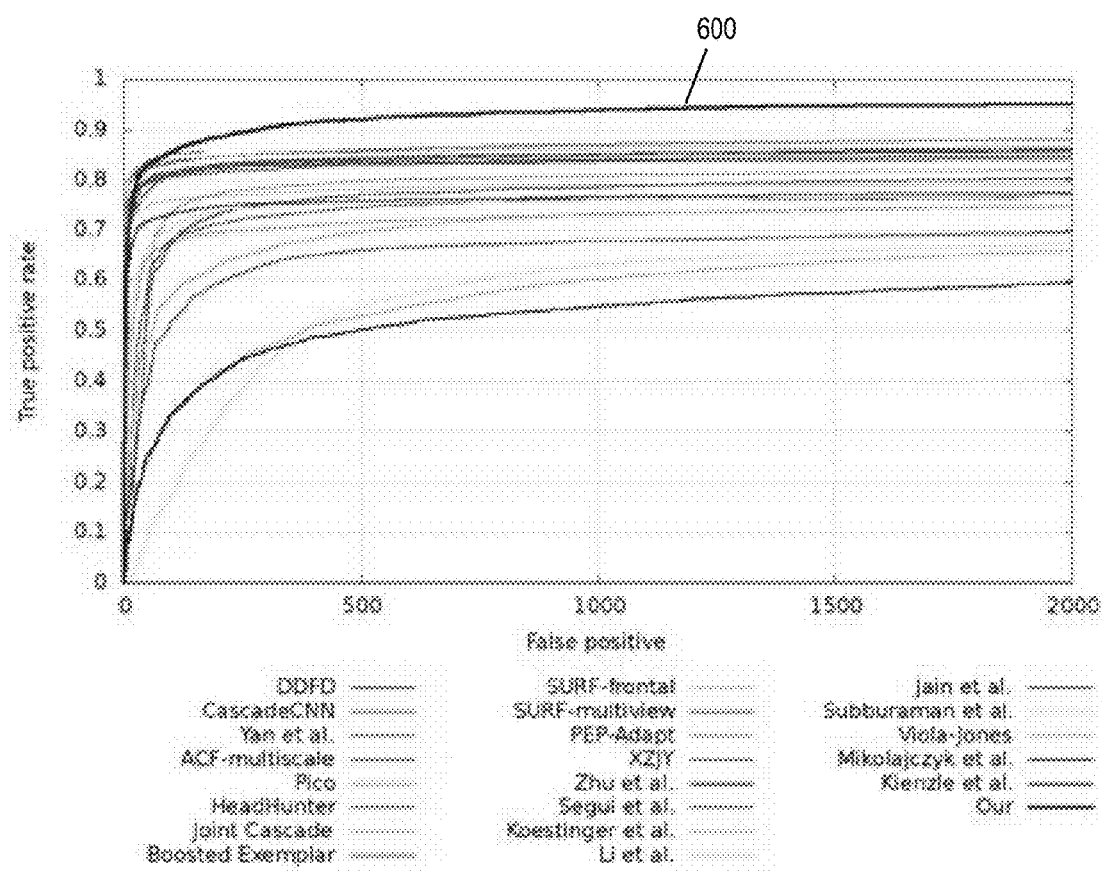
FIG. 6 is a graph of true positive rate versus false positive rate for the tested MS-FRCNN method and many other face-detection methods.

In this experiment, the training phase was the same as in testing set and are divided into three parts based on their detection rates on EdgeBox. In other words, face images were divided into three levels according to the difficulties of the detection, namely, easy, medium, and hard. The presently disclosed MS-FRCNN method was compared against recent face detection methods, i.e., two-stage CNN, Multi-scale Cascade CNN, Faceness, and Aggregate channel features (ACF). All these methods were trained on the same training set and tested on the same testing set. The corresponding respective Precision-Recall curves 500, 504, 508, 512, and 516 and AP values are shown in FIGS. 5A to 5C for, respectively, the easy, medium, and hard levels of detection difficulty. The presently disclosed MS-FRCNN has highly competitive results with the state-of-the-art performance against recent face detection methods. It achieves the best average precision in all level faces, i.e., AP=0.879 (easy), 0.773 (medium), and 0.399 (hard). FIG. 6 of U.S. Provisional Patent Application Ser. No. 62/495,445, filed Sep. 8, 2016, and titled "CMS-RCNN: Contextual Multi-scale Region-based CNN Approach to Robust Face Detection" ("the '445 application"), which in incorporated herein by reference above, shows some examples of face detection results using the proposed MS-FRCNN on this database.

IV. 4. Face Detection on FDDB Database

To show that the presently disclosed MS-FRCNN method generalizes well to other standard datasets, the MS-FRCNN was also benchmarked on the FDDB database. The FDDB database is a standard database for testing and evaluation of face detection algorithms. It contains annotations for 5,171 faces in a set of 2,845 images taken from the Faces in the Wild dataset. The same model that was trained on Wider Face database presented in Section IV.1 was used to perform the evaluation on the FDDB database.

The evaluation was performed based on the discrete criterion, i.e., if the ratio of the intersection of a detected region with an annotated face region was greater than 0.5, then it was considered as a true positive detection. The evaluation proceeded following the FDDB evaluation protocol and compared against the published methods provided in most of the published face detection methods and achieved a very high recall rate comparing against all other methods (as shown FIG. 6 wherein curve 600 shows the true positive rate to be largely consistently above the curves for all other methods depicted). This was concrete evidence to demonstrate that MS-FRCNN robustly detects unconstrained faces. FIG. 8 of the '445 application shows some examples of the face detection results using the proposed MS-FRCNN on the FDDB database.

V. Example Computing System

It is to be noted that any one or more of the aspects and embodiments described herein may be conveniently implemented in and/or using one or more machines (e.g., one or more computers, one or more communications network devices, one or more electrical distribution network devices, any combination and/or network thereof, among other things) programmed according to the teachings of the present specification, as will be apparent to those of ordinary skill in the computer arts. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, a laptop computer, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

FIG. 7 shows a diagrammatic representation of one embodiment of a computing device in the exemplary form of a computer system 700 within which a set of instructions for performing any one or more of the aspects and/or methodologies of the present disclosure may be executed. It is also contemplated that multiple computing devices may be utilized to implement a specially configured set of instructions for causing one or more of the devices to contain and/or perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Memory 708 may include various components (e.g., machine-readable media) including, but not limited to, a random access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of processing an image to detect the presence of one or more objects of a desired classification in the image, the method being performed in an object-detection system and comprising:
   receiving the image and storing it in computer memory;
   sequentially convolving the image in a series of at least two convolution layers to create a corresponding series of feature maps of differing scales;
   pooling at least one of the feature maps to create a corresponding at least one pooled feature map;
   normalizing, relative to one another, the at least one pooled feature map and each of the feature maps not pooled to create a series of normalized feature maps;
   concatenating the series of normalized feature maps together with one another to create a concatenated feature map;
   dimensionally reducing the concatenated feature map to create a dimensionally reduced feature map;
   processing the dimensionally reduced feature map in a first set of fully connected layers to create a proposal comprising a bounding box corresponding to a suspected object of the desired classification in the image and an objectness score for the suspected object, wherein the first set of fully connected layers has been trained on the desired classification;

if the objectness score exceeds a predetermined threshold, then projecting the bounding box back to each of the at least two feature maps to identify a region of interest in each of the at least two feature maps;

pooling each of the regions of interest to create a corresponding pooled region of interest;

normalizing, relative one another, the pooled regions of interest to create a set of normalized regions of interest;

concatenating the normalized regions of interest with one another to create a concatenated region of interest;

dimensionally reducing the concatenated region of interest to create a dimensionally reduced region of interest;

processing the dimensionally reduced region of interest in a second set of fully connected layers to generate a confidence score for the region of interest, wherein the second set of fully connected layers is trained on the desired classification; and storing the bounding box and the confidence score in the computer memory in association with the image.

2. The method according to claim 1, wherein the normalizing of the at least one pooled feature map and each of the feature maps not pooled is performed using an L2 normalization.

3. The method according to claim 1, wherein the processing of the dimensionally reduced region of interest to generate a determined confidence score includes using a softmax function.

4. The method according to claim 1, wherein the desired classification is a human face.

5. The method according to claim 1, further comprising the annotating the image to include a visual depiction of the bounding box and the confidence score.

6. The method according to claim 1, wherein the pooling of at least one of the feature maps includes using a max pooling algorithm.

7. The method according to claim 1, wherein the pooling of at least one of the feature maps includes pooling at least two of the feature maps.

8. The method according to claim 1, wherein the normalization of the pooled regions of interest is performed using an L2 normalization.

9. The method according to claim 1, wherein dimensionally reducing the concatenated region of interest includes using a 1×1 convolution.

10. The method according to claim 1, further comprising displaying to a user on an electronic display, the image, a visual depiction of the bounding box overlaid on the image, and a the confidence score displayed in association with the bounding box.

11. A computer-readable storage medium containing computer-executable instructions that, when executed by a computing system, performs a method of processing an image to detect the presence of one or more objects of a desired classification in the image, the method being performed in an object-detection system and comprising:

receiving the image and storing it in computer memory;

sequentially convolving the image in a series of at least two convolution layers to create a corresponding series of feature maps of differing scales;

pooling at least one of the feature maps to create a corresponding at least one pooled feature map;

normalizing, relative to one another, the at least one pooled feature map and each of the feature maps not pooled to create a series of normalized feature maps;

concatenating the series of normalized feature maps together with one another to create a concatenated feature map;

dimensionally reducing the concatenated feature map to create a dimensionally reduced feature map;

processing the dimensionally reduced feature map in a first set of fully connected layers to create a proposal comprising a bounding box corresponding to a suspected object of the desired classification in the image and an objectness score for the suspected object, wherein the first set of fully connected layers has been trained on the desired classification;

if the objectness score exceeds a predetermined threshold, then projecting the bounding box back to each of the at least two feature maps to identify a region of interest in each of the at least two feature maps;

pooling each of the regions of interest to create a corresponding pooled region of interest;

normalizing, relative one another, the pooled regions of interest to create a set of normalized regions of interest;

concatenating the normalized regions of interest with one another to create a concatenated region of interest;

dimensionally reducing the concatenated region of interest to create a dimensionally reduced region of interest;

processing the dimensionally reduced region of interest in a second set of fully connected layers to generate a confidence score for the region of interest, wherein the second set of fully connected layers is trained on the desired classification; and storing the bounding box and the confidence score in the computer memory in association with the image.

12. The computer-readable storage medium according to claim 11, wherein the normalizing of the at least one pooled feature map and each of the feature maps not pooled is performed using an L2 normalization.

13. The computer-readable storage medium according to claim 11, wherein the processing of the dimensionally reduced region of interest to generate a determined confidence score includes using a softmax function.

14. The computer-readable storage medium according to claim 11, wherein the desired classification is a human face.

15. The computer-readable storage medium according to claim 11, further comprising the annotating the image to include a visual depiction of the bounding box and the confidence score.

16. The computer-readable storage medium according to claim 11, wherein the pooling of at least one of the feature maps includes using a max pooling algorithm.

17. The computer-readable storage medium according to claim 11, wherein the pooling of at least one of the feature maps includes pooling at least two of the feature maps.

18. The computer-readable storage medium according to claim 11, wherein the normalization of the pooled regions of interest is performed using an L2 normalization.

19. The computer-readable storage medium according to claim 11, wherein dimensionally reducing the concatenated region of interest includes using a 1×1 convolution.

20. The computer-readable storage medium according to claim 11, further comprising displaying to a user on an electronic display, the image, a visual depiction of the bounding box overlaid on the image, and a the confidence score displayed in association with the bounding box.

* * * * *